March 26, 1946.          E. K. STODOLA          2,397,167
                  RECEIVER PROTECTION CIRCUIT
                       Filed May 24, 1944
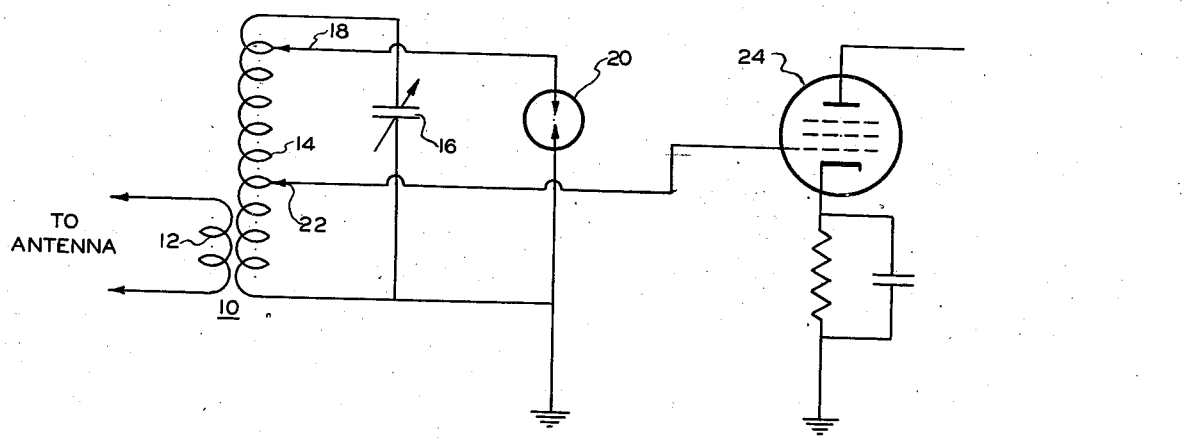
INVENTOR.
EDWIN K. STODOLA
BY
William D. Hall,
ATTORNEY Patented Mar. 26, 1946

2,397,167

UNITED STATES PATENT OFFICE 2,397,167

RECEIVER PROTECTION CIRCUIT

Edwin K. Stodola, Neptune, N. J., assignor to the Government of the United States of America, as represented by the Secretary of War Application May 24, 1944, Serial No. 537,123

2 Claims. (Cl. 250—20)

(Granted under the act of March 3, 1883, as amended April 30, 1928; 370 O. G. 757)

The invention described herein may be manufactured and used by or for the Government for governmental purposes, without the payment to me of any royalty thereon.

This invention relates generally to amplitude-limiting circuits. More particularly, it relates to means for preventing saturation and/or damage to the components of a radio receiver used as part of a pulse-echo object detection or location system.

In accordance with conventional methods of pulse-echo object detection, a normally blocked radio transmitter is intermittently keyed for short periods, at intervals considerably longer than said periods, so that pulses of wave energy are transmitted in a desired direction. Any object or body in the path of said energy will reflect or reradiate a portion of said energy back to the source, and the observed time interval between the transmission of the pulse and the reception of the echo is a measure of the distance from the source to the reflecting body. Similar techniques are used for terrain-clearance indication.

Since only a minute portion of the transmitted energy is reflected, it is necessary to transmit pulses of high peak power and use sensitive receivers. Because of the proximity of the transmitter and receiver, especially when a common antenna is used for both, it is necessary to provide some means for preventing the saturation of the receiver, or even damage to its components, by the powerful transmitted pulses or nearby echoes.

It is an object of this invention to provide a simple and flexible amplitude-limiting means for protecting a circuit from excessive potentials impressed thereon.

Another object of this invention is to provide a novel amplitude-limiting circuit which is easily adaptable for use under a wide variety of conditions.

Another object of this invention is to provide a novel amplitude-limiting circuit using a non-linear impedance, such as a spark or arc-discharge tube, wherein the same tube can be used for maintaining the voltage amplitude at different levels.

For a better understanding of the invention, together with other and further objects thereof, reference is had to the following description taken in connection with the accompanying drawing, and its scope will be pointed out in the accompanying claims.

Reference is now made to the drawing, wherein there is shown a schematic circuit of the invention, incorporated as part of the tuned input-circuit of a pulse-echo receiver; although it may be constructed as a separate unit and/or applied to any other type of network. This circuit comprises a tuned step-up transformer 10, of which the primary coil 12 may be coupled to the antenna circuit of the system, and the secondary coil 14 coupled to the grid of tube 24. Secondary coil 14 is resonated to the frequency of the incoming signals by an adjustable capacitor 16. A non-linear impedance, such as spark or arc-discharge tube 20, is connected across all or a major part of the secondary coil 14, depending upon the setting of the movable tap 18, while the control grid of the first amplifier tube 24 of the receiver is connected, through an adjustable tap 22, to a smaller portion of secondary coil 14.

It will be seen that the voltage across primary coil 12 can be transferred to the grid of tube 24 with little or no multiplication, depending upon how far down the secondary coil 14 the tap 22 is positioned. On the other hand, the voltage impressed upon tube 20 is multiplied to a higher level, since it is connected across substantially the entire secondary coil. Thus a relatively low level of voltage across the primary can be multiplied to the required amount of voltage necessary to break down the spark gap tube 20, thereby substantially short circuiting the secondary coil and thus considerably reducing the energy transfer to amplifier tube 24. Preferably, the transformer circuit should have low losses, whereby only a small excess voltage is sufficient to break down the spark gap. The Q, i. e., reactance-to-resistance ratio, of the circuit should be as high as is consistent with the band width requirements of the receiver.

The above-described circuit makes it possible to use a given spark or arc-discharge tube, which breaks down at a predetermined voltage, to keep the potential at the input circuit at a lower level than said voltage. It also makes possible the use of the same spark gap tube to limit the input of a wide variety of receivers of different sensitivities and having different maximum input voltage characteristics, by merely keeping the voltage applied to the receiver at the required level and then providing sufficient voltage step-up to break down the spark gap.

Various other changes and modifications may be made without departing from the invention, and it is, therefore, aimed in the appended claims, to cover all such changes and modifications as fall within the true spirit and scope of the invention.

I claim:

1. In a pulse-echo object detection system, a receiver and amplitude-limiting means therefor, said means comprising a tuned, low-loss step-up transformer, means to impress incoming signals on the primary circuit of said transformer, a normally nonconducting spark gap connected across points of maximum potential on the secondary circuit of said transformer, and an output circuit connected across points of lower potential on said secondary circuit.

2. In a pulse-echo object detection system, a tuned input circuit including a low-loss step-up transformer upon the primary coil of which incoming signals are impressed, a tuning condenser connected across the entire secondary coil of said transformer, a spark gap connected across a variable portion of said secondary coil, and an electron tube amplifier having its grid circuit connected across a variable portion of said secondary coil, the portion of said coil across which said spark gap is connected having a greater potential difference thereacross than the portion across which said amplifier is connected.

EDWIN K. STODOLA.